United States Patent
Goodsitt et al.

(10) Patent No.: US 11,714,833 B2
(45) Date of Patent: Aug. 1, 2023

(54) MEDIUMS, METHODS, AND SYSTEMS FOR CLASSIFYING COLUMNS OF A DATA STORE BASED ON CHARACTER LEVEL LABELING

(71) Applicant: Capital One Services, LLC, McLean, VA (US)

(72) Inventors: Jeremy Edward Goodsitt, Champaign, IL (US); Austin Grant Walters, Savoy, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 32 days.

(21) Appl. No.: 17/471,764

(22) Filed: Sep. 10, 2021

(65) Prior Publication Data
US 2022/0075805 A1     Mar. 10, 2022

Related U.S. Application Data

(60) Provisional application No. 63/076,712, filed on Sep. 10, 2020.

(51) Int. Cl.
*G06F 16/00*     (2019.01)
*G06F 16/28*     (2019.01)
*G06N 3/04*     (2023.01)

(52) U.S. Cl.
CPC .............. *G06F 16/285* (2019.01); *G06N 3/04* (2013.01)

(58) Field of Classification Search
CPC .................................................. G06F 16/285
(Continued)

(56) References Cited

U.S. PATENT DOCUMENTS

| 8,751,226 B2* | 6/2014 | Yamamoto | G10L 15/065 |
| | | | 704/231 |
| 2021/0012215 A1* | 1/2021 | Fei | G06N 7/01 |
| | | | 707/707 |

FOREIGN PATENT DOCUMENTS

WO    WO/2020/193966    * 10/2020    ........... G06F 40/295

OTHER PUBLICATIONS

Tay et al., "Charformer: Fast Character Transformers via Gradient-based Subword Tokenization", Cornell University [online], Submitted on Jun. 23, 2021, Retrieved from URL:<https://arxiv.org/abs/2106.12672>, Retrieved on Jul. 2, 2021, 19 pages.

* cited by examiner

*Primary Examiner* — Alexandria Y Bromell
(74) *Attorney, Agent, or Firm* — KDW Firm PLLC

(57) ABSTRACT

Exemplary embodiments pertain to new techniques for classifying or labeling organized data. A major impediment to implementing high-quality machine learning is the lack of readily accessible labeled data. In some cases, data can be classified using a classifier, but these solutions can be inaccurate and slow. Exemplary embodiments address the problem of obtaining accurate labeled data in a timely manner by applying a classifier configured to operate on character-level embeddings. Among other advantages, this can help the classifier to recognize information contained within a data unit, such as a cell of a table. The classifier may operate within the organizational structure of the data, such as by operating across a particular row or column of a table. Because data within a particular row or column is often (Continued)

temporally organized (e.g., transactions that are logged in chronological order), row- or column-based approaches can yield more accurate results.

20 Claims, 9 Drawing Sheets

(58) Field of Classification Search
USPC .......................................................... 707/737
See application file for complete search history.

| | | | | |
|---|---|---|---|---|
| John Doe | 123 Fake St. | Houston | TX | (123) 456-7890 | 9876543210 |
| Jane Doe | 456 Unreal Ave. | Boston | MA | (098) 765-4321 | 1123581321 |
| Jack Doe | 789 False Blvd. | San Francisco | CA | (246) 135-7911 | 1111211331 |
| Joe Doe | 0 Bogus Way | Washington | DC | (111) 222-3333 | 1234567890 |
| Jill Doe | 0 Rainrun St. | Waterdeep | SC | (202) 020-2020 | 3141592654 |
| Jeremy Doe | 344 Clinton St. | Metropolis | NY | (271) 828-1828 | 7427466391 |

FIG. 1

MEDIUMS, METHODS, AND SYSTEMS FOR CLASSIFYING COLUMNS OF A DATA STORE BASED ON CHARACTER LEVEL LABELING

CROSS-REFERENCE TO RELATED APPLICATIONS

This application claims priority to U.S. Provisional Patent Application Ser. No. 63/076,712, filed on Sep. 10, 2020 and entitled "Mediums, Methods, and Systems for Classifying Columns of a Data Store Based on Character Level Labeling." The contents of the aforementioned application are hereby incorporated by reference in their entirety.

BACKGROUND

In recent years, there has been tremendous growth in the amount of data available for analysis. Though this data may be very valuable for tasks such as machine learning (ML) and artificial intelligence (AI), these applications generally require training data that is labeled (e.g., that is tagged with a designator indicating what type of data it is, a type of intent associated with the data, etc.). AI/ML algorithms may accept labeled training data and learn to associate the data with the labels. The AI/ML algorithm then learns to generalize the labels to new data. Although a large amount of data exists that could theoretically be used to train AI/ML systems, that data is generally not labeled and therefore of limited usefulness.

SUMMARY

Exemplary embodiments relate to computer-implemented methods, as well as non-transitory computer-readable mediums storing instructions for performing the methods, apparatuses configured to perform the methods, etc.

In one aspect, a computer-implemented method includes receiving formatted input data. The formatted input data may include a plurality of data units organized into a plurality of organizational units. For example, in some embodiments, the input data may be in the form of a table or database arranged into rows and columns. In this case, the data unit may be a cell in the table, and the organizational units may be rows and/or columns in the table. The present disclosure is not limited to use in a table or database; any formatted data structure may be used. If the data structure is not organized into rows and columns, any suitable organized subsample of the data may be used. For example, if the data is in the form of a comma-separated value ("CSV") list, the data may be arranged in a repeating pattern, and the repeating pattern may include an organizational structure so that every nth data element is related.

Classifiable data may be retrieved from a first one of the organizational units. For example, if the organizational units are columns in a table, then cell-level data may be retrieved from one of the columns of the table.

The classifiable data may be sent to a classifier configured to to perform a character-level classification and output a label from a predetermined set of labels (e.g., "phone number," "account number," "name," "address," etc. The particular labels to be applied will depend on the context). For example, the classifier may be an artificial intelligence or a machine-learning algorithm, such as a neural network (although any suitable type of classifier may be used). The classifier may be trained to operate on character-level data; for example, the classifier may be configured to operate on input values represented as character-level embeddings. An embedding represents a relatively low-dimensional space into which relatively high-dimensional vectors may be translated; typically, an embedding places semantically-similar inputs close together in the embedding space, which allows the embedding to capture and represent the semantics of the input. An example of a suitable embedding is a Glove Character embedding, although other suitable embeddings will be apparent to one of ordinary skill in the art.

The classifier may be trained to extract information at a sub-data-unit level. For instance, if the data unit is a cell in a table, the classifier may be trained to extract information within a cell that forms a part of the data in the cell, such as area codes within a phone number, geographical information within a social security number, a credit card issuer encoded within a credit card number, etc. This may be achieved by treating the sub-data-unit information as a feature of the data, and training the classifier to recognize these features as part of the training process.

Various types of classifiers may be used. In some embodiments, a convolutional neural network ("CNN") may be applied to the data. This may involve treating the data in a similar manner to a picture—a data unit may be selected, and a kernel may be applied that accepts the data unit and a set of adjacent data units. For example, data from the first organizational unit (e.g., a column in a table) may be considered alongside data from a second organizational data unit (e.g., an adjacent column in the table; the kernel may also encompass adjacent data from the same organizational unit, such as cells above and/or below the cell of interest in the same column). These selected data units may be used as inputs to deeper layers of the neural network, allowing contextual information to be extracted and processed.

In some embodiments, the CNN may make use of a conditional random field (a "CRF," e.g., as a last layer of the network). The use of a CRF is beneficial, because it allows the network to learn the label for a given character based on its neighbors, thus improving accuracy.

Another example of a classifier suitable for use with exemplary embodiments is a temporal neural network ("TNN"). A temporal neural network may be applied as a temporally-oriented neural network ("NN") or deep neural network ("DNN"), or can be combined with convolutions as a temporal convolutional network ("TCN"). A temporal network is configured to consider data arranged in a temporal direction. For example, the data may represent transactions arranged in chronological order (e.g., in increasing order of time) in a column of a table, or might represent integer values that have been sorted so as to be increasing through the column. In a TCN, the convolution kernel may be arranged so as to convolve over the data in a temporally-forward direction (e.g., down the column, as opposed to considering data in the backwards direction up the column). The arrangement and/or pattern of such temporally-oriented data may provide a TNN with additional insights into the nature of the data, and may thus assist with labeling the data.

In some embodiments, some of the data considered by a convolutional network (e.g., a CNN or TCN) may be masked. For instance, the CNN may select a data unit from a first column of the table, and may consider adjacent units in the same row as the data unit; the next row may then be skipped, and then data units falling within the kernel in the third row may be considered. This helps to improve the throughput of the convolutional network and generally at least maintains the same level of accuracy as an unmasked convolutional network.

All of the classifiable data from the organizational unit may be sent to the classifier, or the classifiable data may be sampled and only some of the classifiable data may be sent to the classifier. This sampling can help to speed up the classification process. In some embodiments, the data may be randomly sampled; in others, every nth data unit from the organizational unit may be used.

A label for the classifiable data may be received from the classifier. The label may be assigned to the first one of the organizational units. The label may be selected from a predetermined list of labels over which the classifier was trained. The classifier may be trained on data that is pre-labeled (manually, or by some other technique) with labels from the list.

In some embodiments, the data elements (e.g., cells) of the first one of the organization units (e.g., the column) may be broken into chunks of a predetermined size. The chunks may be provided to the classifier for classification, either individually or in batches (where the batches includes a predetermined number of the chunks, or a predetermined amount of data). A label may be received for each chunk or batch, and if there is disagreement between the labels, the most-prevalent label, the mode of the labels, or a random label may be selected as the label for the entire organizational unit.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

FIG. 1 depicts an exemplary input structure in the form of a table in accordance with one embodiment.

DETAILED DESCRIPTION

Figure 2:
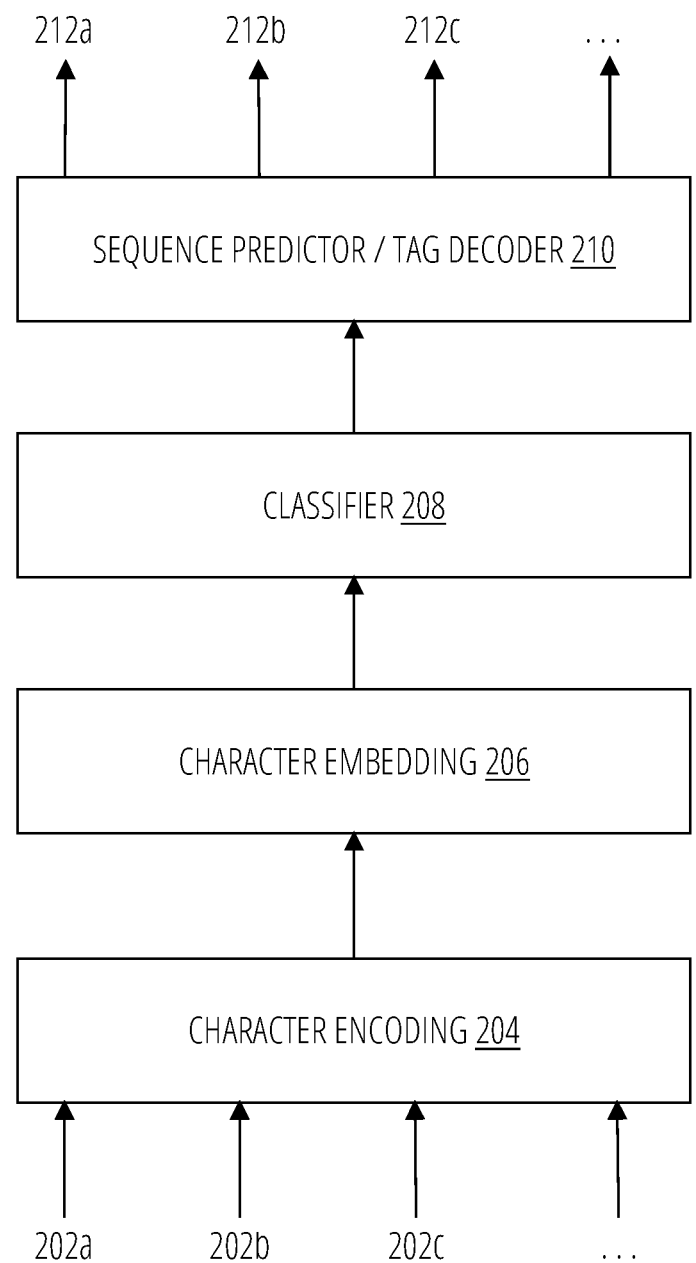
FIG. 2 depicts an overview of an exemplary character-level model architecture in accordance with one embodiment.

Exemplary embodiments relate to methods, mediums, and systems that may be used to classify and label large sets of data in an efficient and accurate manner. One possible solution to this problem is to take a data store such as a database, read multiple cells from the database and concatenate their values, and then treat this concatenated information as a sentence. A classifier could be trained on these sentences to classify and label the columns (e.g., by breaking the sentences into n-grams and then being trained on the n-grams).

A problem with this approach is that it does not consider information within the cells themselves. In some cases, inter-cell data values can have valuable information that can be used for classification (e.g., a phone number might include an area code, or social security numbers might include common geographical designation values). By treating all the values in the column as a monolithic input, this approach loses some of the useful inter-cell context.

In contrast, exemplary embodiments consider cell-level information by using a character-level classifier. At a high level, exemplary embodiments may be represented by the following pseudocode:

10 Access a data structure organized into columns and rows
20 Load a column, row, or other subsample
30 (Optional) Split the loaded column/row/subsample into chunks
40 Send the data/chunks to a classifier, where the classifier is pre-trained using character-level classifications
50 Identify majority labels and classify the row/column/subsample breakdown using the labels, performing thresholding for outliers
60 Repeat for the remaining document/data store There are a number of ways to split the analyzed data structure into chunks and perform classification at 30 and 40, above. Some embodiments may utilize a convolutional neural network ("CNN"), performing convolutions around a cell of interest (e.g., incorporating cells in neighboring rows, columns, or both). Because data in data structures is often organized in some way (e.g., a row or column may include dates or integers in ascending order), a CNN can bring in additional contextual data to improve labeling performance.

Other embodiments may utilize a temporal neural network ("TNN"). In a TNN, multiple data items might be considered at the same time, but some may be masked out. For instance, when a data structure is organized in some manner (e.g., a particular column includes a list of dates), then incorporating some contextual information may be helpful but primarily when this is done in the direction that the data structure is oriented. In other words, when a data structure is organized row-by-row, the information in neighboring columns may be less helpful in classifying a certain cell than the information in neighboring rows. By masking out some of the less helpful data (e.g., some of the neighboring columns in the above example), the system can still receive helpful contextual information while improving processing time and reducing the number of resources required.

Still other embodiments may combine convolutional and temporal neural networks, as discussed in more detail below.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Exemplary embodiments accept organized but unlabeled input data, and output labels for the organizational elements making up the input data. For example, the input data may be in the form of (for example) a table of financial or healthcare data, organized into rows and columns. The input data may be provided to a classifier, which may output a label for a particular column (or row, depending on the organizational structure) based on the contents of that column.

FIG. 1 depicts an exemplary organized input structure for purposes of illustration. The input data includes multiple data units 102 organized into organizational units (rows and columns). For instance, the input data is organized into a first organizational unit 104 representing a column of phone numbers and a second organizational unit 106 representing a column of account numbers. The organizational units also include rows in the data structure, such as the third organizational unit 108.

The input data may be labeled according to a character-level process, an example of which is shown in FIG. 2.

Figure 3:
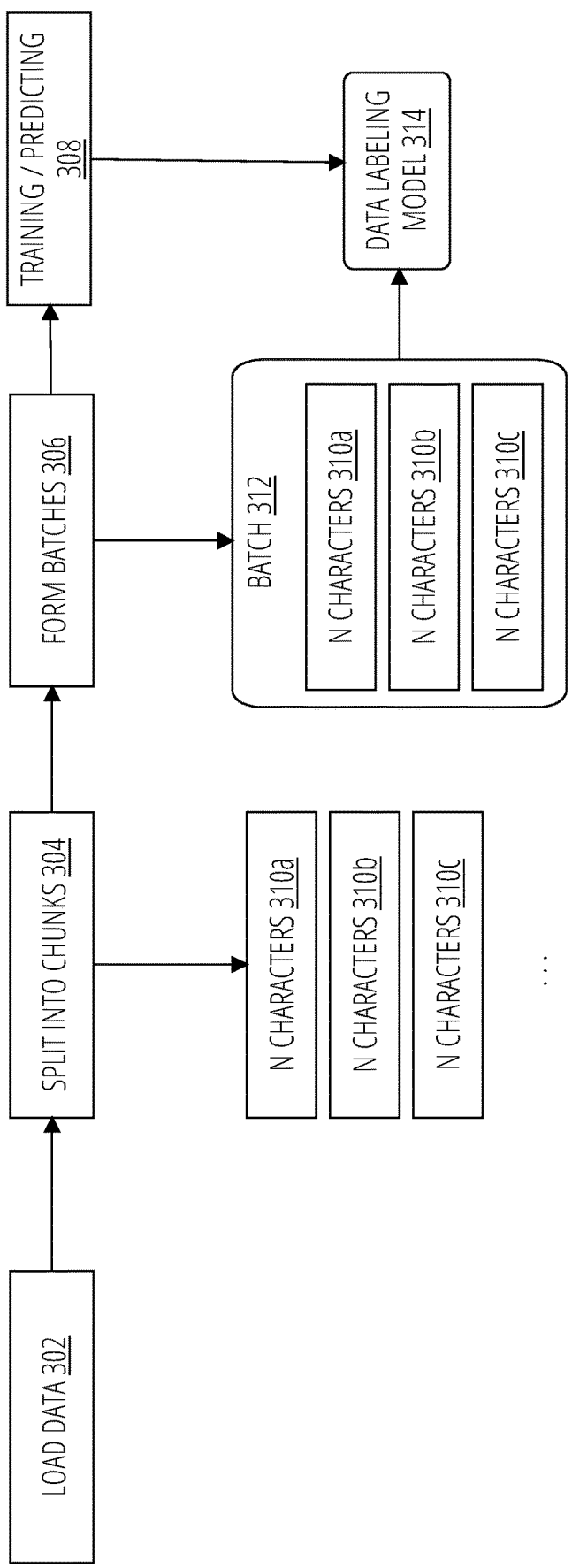
FIG. 3 illustrates an exemplary flattening process for flattening input data in accordance with one embodiment.

The input data may be broken into characters 202a, 202b, 202c, . . . . The characters may be encoded in a character encoding 204. For example, the input characters may be flattened and arranged into a data structure suitable for processing by a classifier 208. For example, the input data may be sampled so that only a subset of the data elements (and therefore a subset of the characters 202a, 202b, 202c, . . . are considered). The input data may also or alternatively be arranged into chunks and/or batches, as shown in FIG. 3. The characters 202a, 202b, 202c, . . . may be concatenated together, potentially with data item separators placed between different data units (as shown, for example, in FIG. 4).

After being encoded, the input characters may be embedded in a character embedding 206. A character embedding represents a relatively low-dimensional space into which relatively high-dimensional vectors may be translated; typically, an embedding places semantically-similar inputs close together in the embedding space, which allows the embedding to capture and represent the semantics of the input. An example of a suitable embedding is a Glove Character embedding, although other suitable embeddings will be apparent to one of ordinary skill in the art.

The character embedding 206 may be provided to a classifier 208. Although many different types of classifiers exist, exemplary embodiments utilize classifiers configured to operate on character-level input data (such as the character embedding 206) and/or that are configured to operate on columnar-level or row-level (or some other organizational unit) data from a data structure. Some classifiers may apply sub-word tokenization, such as the one described in *Charformer: Fast Character Transformers via Gradient-based Subword Tokenization* by Tay et al. (2021).

Figure 7:
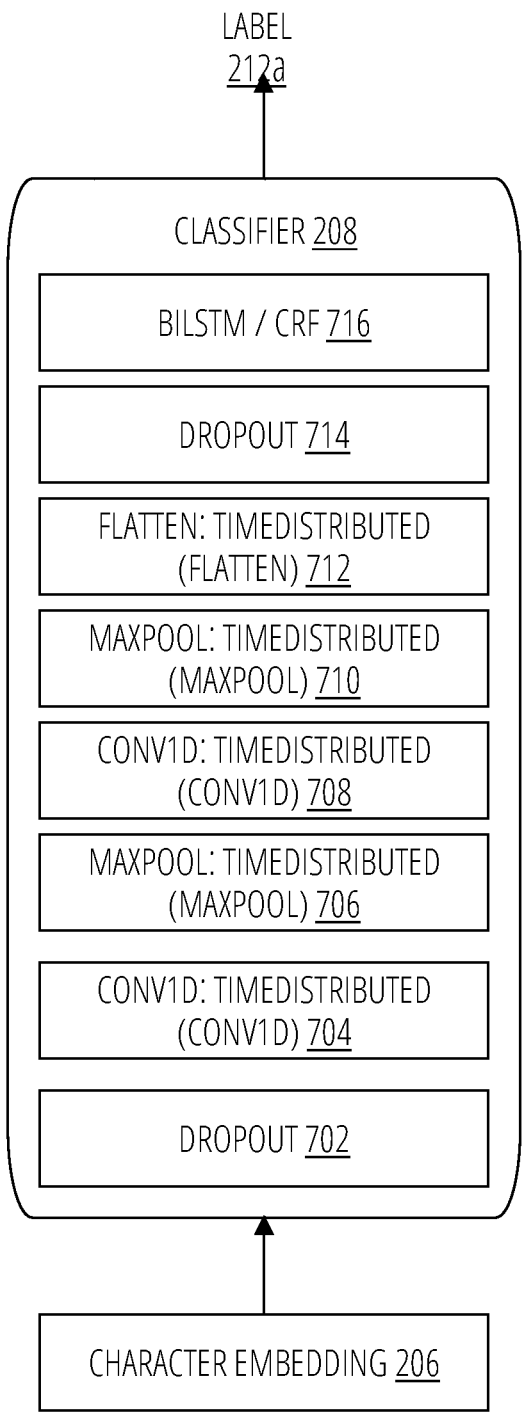
FIG. 7 depicts an exemplary columnar-level neural network model in accordance with one embodiment.

The classifier 208 may be an artificial intelligence ("AI") or machine learning ("ML") algorithm configured to accept input data and output a label from a predefined set of labels. Suitable examples of classifiers 208 include neural networks, such as deep neural networks ("DNNs"), convolutional neural networks ("CNNs"), temporal neural networks ("TNNs"), and temporal convolutional networks ("TCNs"). An example of a suitable model structure are for one embodiment of a classifier 208 is shown in FIG. 7.

The output of the classifier 208 may be provided to a sequence predictor/tag decoder 210. Whereas a classifier 208 may predict a label for a single sample without considering neighboring samples, a sequence predictor/tag decoder 210 may take the context of surrounding samples into account. The sequence predictor/tag decoder 210 helps to improve or optimize sequence prediction. An example of a sequence predictor/tag decoder 210 is a conditional random field ("CRF"), which is a statistical modeling method that models a prediction as a graphical model implements dependencies between the predictions. The sequence predictor/tag decoder 210 may be a part of the classifier 208, or may be separate from the classifier 208.

The output of the sequence predictor/tag decoder 210 may be a set of labels 212a, 212b, 212c, . . . . Multiple labels may be output for a single column, and therefore it may be necessary to choose between the labels to select the most appropriate one. In some embodiments, the most-prevalent label (the label that occurs the most in the output data) may be used. In some embodiments, the classifier 208 may output a confidence score with each label, and the label with the highest average confidence score may be chosen. In some embodiments, the labels may be arranged in an order, and the mode of the labels may be selected. Thresholding may be applied to the output labels, so that in order to be considered as the label for the column the label must have been output by the classifier 208/sequence predictor/tag decoder 210 more than a predetermined minimum threshold number of times.

As noted above, input data may be chunked and/or batched in order to improve performance. In one test, flattening the data through chunking and batching was found to improve throughput by up to six times when implemented on a central processing unit (CPU), and three to four times when implemented on a graphics processing unit (GPU). An example of the flattening process used to achieve these benefits is shown in FIG. 3.

At block 302, the data may be loaded into memory. For example, a column of data may be read in from a table. In some embodiments, the column may be sampled so that only a portion of the data is loaded. When the data is loaded into memory, the system may preserve the formatting of the data. For instance, if the data is organized into cells, the cell structure may be maintained.

At block 304, the loaded data may be split into chunks. For example, the data may be loaded into arrays 310a, 310b, 310c, . . . of a predetermined size (e.g., 2500-3400 characters).

At block 306, the chunked data may be batched together into batches 312 of a predetermined size (e.g., 8-128 MB). The size of the batches 312 may be selected based on the available GPU/system RAM, so as to use as much of the RAM as possible.

The batches may then be provided to a data labeling model 314 at block 308. The data labeling model 314 may be, for example, the classifier 208 of FIG. 2. Prior to this block, the data may be embedded as described above.

Figure 4:
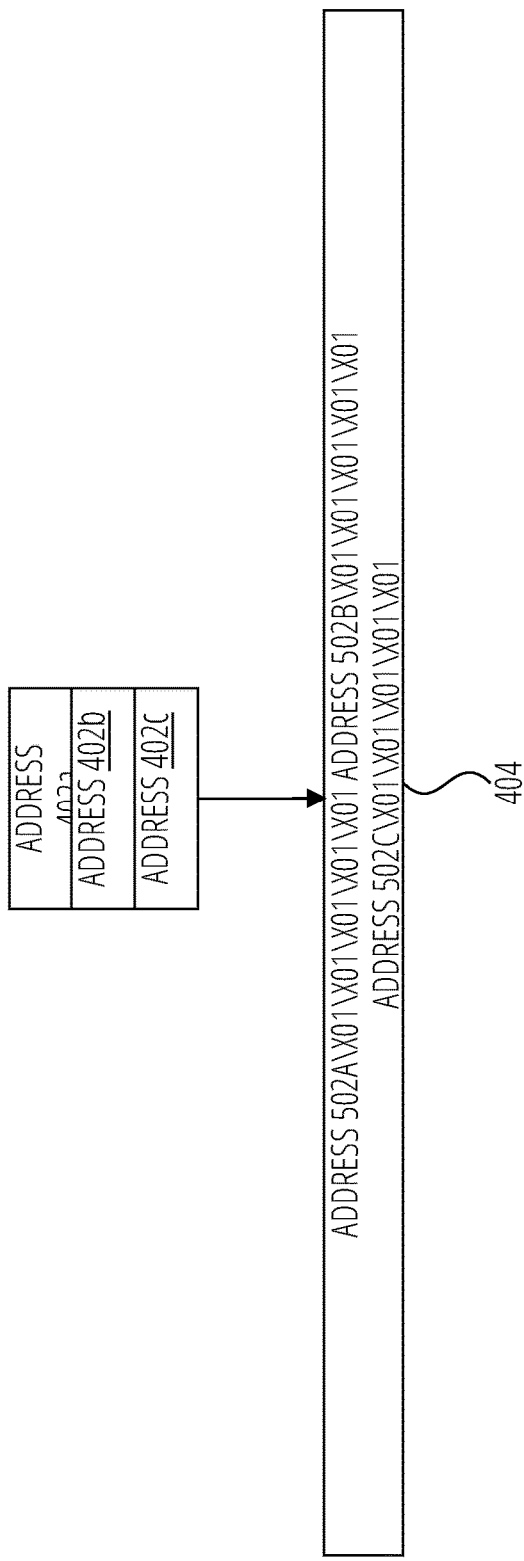
FIG. 4 depicts one technique for sampling and flattening data for processing by a character-level model in accordance with one embodiment.

Whether the data is chunked and batched or not, the data may be flattened by concatenating multiple data units, as shown in FIG. 4. In this example, multiple data units 402a, 402b, 402c (each representing an address in the data) were added to a string, with a cell delimiter ("\X01") placed after each data unit. The resulting concatenated address 404 represents a columnar-based structured data set suitable for processing by a character-level model.

Figure 5:
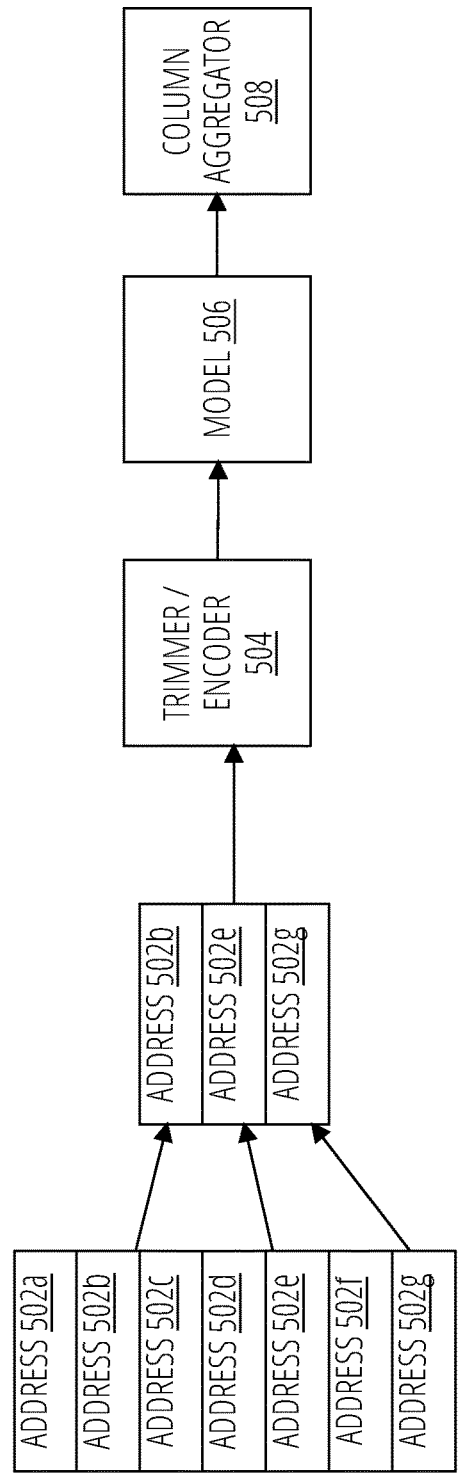
FIG. 5 depicts an exemplary columnar-level model workflow in accordance with one embodiment.

Another approach to flattening and processing the data is depicted in FIG. 5. This approach treats subsampled data units similarly to words in a sentence, which are then provided to the classifier 208 as a single sample.

In this example, a column includes multiple rows, each row representing an address (e.g., addresses 502a, 502b, . . . 502g). The rows/data units are sampled and a predetermined number (three, in this case) are randomly selected (502b, 502e, 502g). The selected addresses are concatenated in a manner similar to the one described above in connection with FIG. 4, and the results are submitted to a trimmer/encoder 504.

The trimmer/encoder 504 limits the received words to a predetermined number of characters (e.g., 52), before encoding them. In this example, the words are encoded using American Standard Code for Information Exchange ("ASCII") indices. The trimmed and encoded input is then provided to a model 506 representing a classifier (such as the one shown in FIG. 7).

The model 506 may output one entity (label) per subsampled row. A column aggregator 508 then performs post-processing to convert the word entity values into a single subsample entity. This may be done by taking the mode of the character entity values. In the case of a tie during prediction, a non-background entity may be manually selected. This subsample entity may serve as the assumed generalized entity selection for the column.

The classifier 208 may apply artificial intelligence/machine learning (AI/ML) to classify data into different categories and assign labels to those categories. Many different techniques can be used to classify data in this manner; for example a neural network can be trained to recognize the category that a data or group of data belong after being trained by adjusting weights applied to neurons in hidden layers of the network. To that end, FIG. 6 depicts an AI/ML environment 600 suitable for use with exemplary embodiments.

Figure 6:
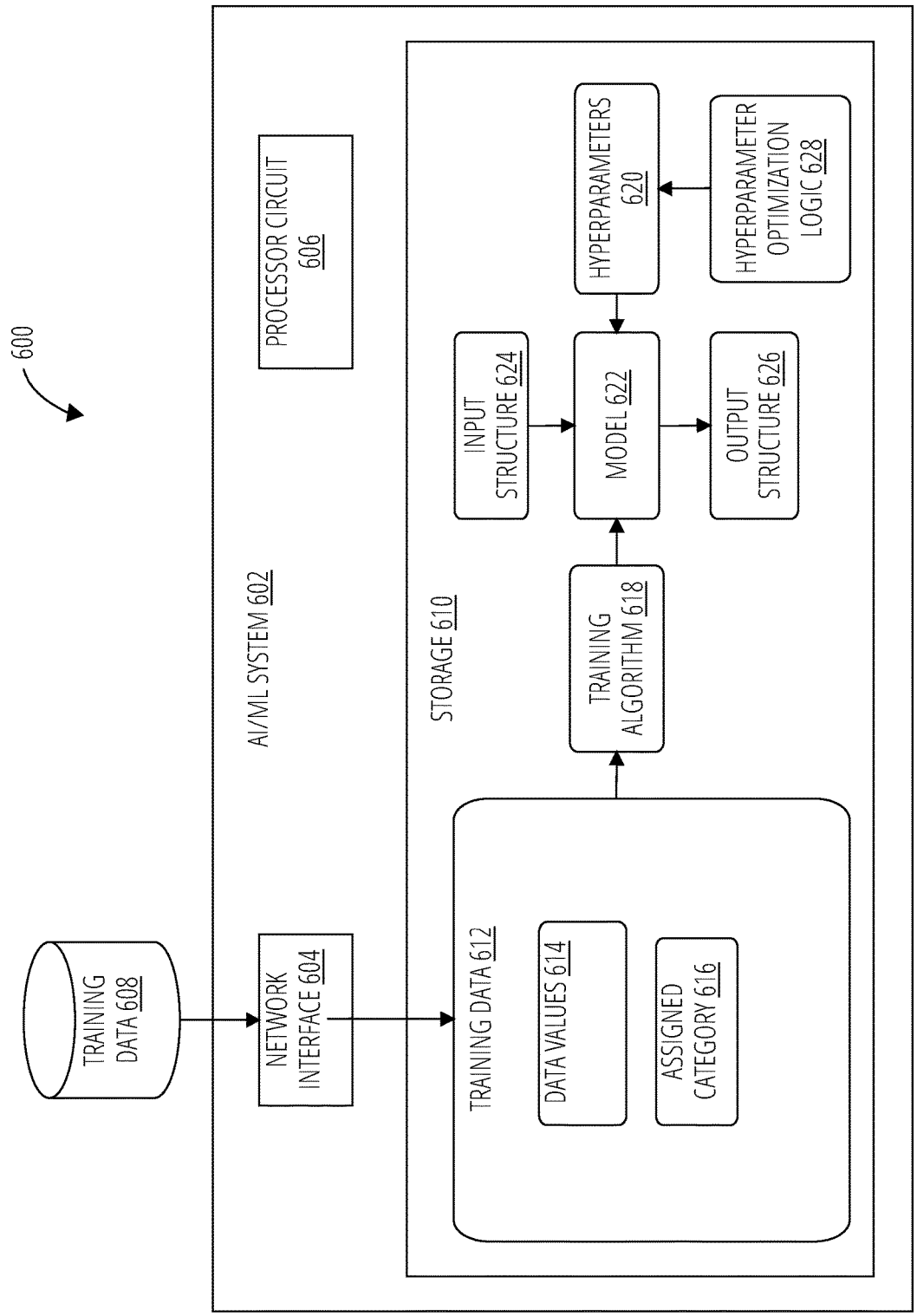
FIG. 6 illustrates an exemplary artificial intelligence/machine learning (AI/ML) system suitable for use with exemplary embodiments.

At the outset it is noted that FIG. 6 depicts a particular AI/ML environment 600 and is discussed in connection with neural networks. However, other classification systems also exist, such as support vector machines that classify data based on maximum-margin hyperplanes. Many classification schemes rely on AI/ML, and one of ordinary skill in the art will recognize that the classifiers referred to herein may be implemented using any suitable technology.

The AI/ML environment 600 may include an AI/ML System 602, such as a computing device that applies an AI/ML algorithm to learn relationships between the above-noted protein parameters.

The AI/ML System 602 may make use of training data 608. In some cases, the training data 608 may include pre-existing labeled data from databases, libraries, repositories, etc. The training data 608 may include, for example, rows and/or columns of data values 614. The training data 608 may be collocated with the AI/ML System 602 (e.g., stored in a Storage 610 of the AI/ML System 602), may be remote from the AI/ML System 602 and accessed via a Network Interface 604, or may be a combination of local and remote data. Each unit of training data 608 may be labeled with an assigned category 616 (or multiple assigned categories); for instance, each row and/or column may be labeled with a classification. In some embodiments, the training data may include individual data elements (e.g., not organized into rows or columns) and may be labeled on an individual basis.

As noted above, the AI/ML System 602 may include a Storage 610, which may include a hard drive, solid state storage, and/or random access memory. In the Storage 610, the data values 614 may be divided into character-level representations (e.g., groups of n characters, where n is a predetermined integer).

The Training Data 612 may be applied to train a model 622. Depending on the particular application, different types of modes' 122 may be suitable for use. For instance, in the depicted example, an artificial neural network (ANN) may be particularly well-suited to learning associations between the above-noted character-level representations of the data values 614 and the assigned category 616. Other types of classifiers, such as support vector machines (SV) may also be well-suited to this particular type of task, although one of ordinary skill in the art will recognize that different types of models 524 may be used, depending on the designers goals, the resources available, the amount of input data available, etc.

Any suitable Training Algorithm 618 may be used to train the model 622. Nonetheless, the example depicted in FIG. 6 may be particularly well-suited to a supervised training algorithm. For a supervised training algorithm, the AI/ML System 602 may apply the data values 614 as input data, to which the resulting assigned category 616 may be mapped to learn associations between the inputs and the labels. In this case, the assigned category 616 may be used as a labels for the data values 614.

The Training Algorithm 618 may be applied using a Processor Circuit 606, which may include suitable hardware processing resources that operate on the logic and structures in the Storage 610. The Training Algorithm 618 and/or the development of the trained model 622 may be at least partially dependent on model Hyperparameters 620; in exemplary embodiments, the model Hyperparameters 620 may be automatically selected based on Hyperparameter Optimization logic 628, which may include any known hyperparameter optimization techniques as appropriate to the model 622 selected and the Training Algorithm 618 to be used.

Optionally, the model 622 may be re-trained over time.

In some embodiments, some of the Training Data 612 may be used to initially train the model 622, and some may be held back as a validation subset. The portion of the Training Data 612 not including the validation subset may be used to train the model 622, whereas the validation subset may be held back and used to test the trained model 622 to verify that the model 622 is able to generalize its predictions to new data.

Once the model 622 is trained, it may be applied (by the Processor Circuit 606) to new input data. The new input data may include unlabeled data stored in a data structure, potentially organized into rows and/or columns. This input to the model 622 may be formatted according to a predefined input structure 624 mirroring the way that the Training Data 612 was provided to the model 622. The model 622 may generate an output structure 626 which may be, for example, a prediction of an assigned category 616 to be applied to the unlabeled input.

The above description pertains to a particular kind of AI/ML System 602, which applies supervised learning techniques given available training data with input/result pairs. However, the present invention is not limited to use with a specific AI/ML paradigm, and other types of AI/ML techniques may be used.

FIG. 7 depicts a particular example of an AI/ML classifier 208 in the form of a CNN, TNN, or TCN. The classifier 208 includes a dropout 702 as a first layer. Dropout 702 prevents excessive co-adaptations on training data. This helps to prevent the problem of overfitting. Dropout layers help generate regularization for the network and increase accuracy, especially where the data includes random context.

Figure 8A:
FIG. 8A depicts an example of a convolution kernel in accordance with one embodiment.
Figure 8B:
FIG. 8B depicts an example of a temporal masked convolution kernel in accordance with one embodiment.

The classifier 208 further includes convolutional blocks 704, 708 followed by maxpool blocks 706, 710. The convolutional blocks 704, 708 may represent a 1-d convolutional layer. Each convolutional layer may apply a convolution kernel, which represents a kind of filter or input lens that determines which data units are selected for processing at each layer. The kernel moves or convolves over the input data, so that different combinations of the input data are fed into the network for further processing. Examples of convolution kernels are illustrated in FIG. 8A and FIG. 8B.

Each convolutional block 704, 708 may be associated with a max pooling layer 706, 710. Maxpooling serves to down-sample an input representation, reducing its dimensionality and allowing the classifier 208 to make inferences about regional features within the input data.

After the paired convolutional and maxpool blocks, the data may be flattened in a flattening layer 712 (in a manner similar to the flattening techniques already described). Another dropout layer 714 follows the flattening layer 712.

As a final layer, a BiLSTM-CRF model is applied. This model is similar to a LSTM (Long Short Term Memory) model, except the model is bidirectional (BiLSTM) and the model's dense layers are replaced by a CRF layer). The use of BiLSTM-CRF can improve the performance of the classifier 208 on name entity recognition ("NER") tasks. In some embodiments, a softmax layer may be applied as the final layer.

The example depicted in FIG. 7 is but one way to arrange a classifier 208; this particular example applies two convolutional layers with max pooling. However, a number of other arrangements can be applied; for example, a CNN with four convolutional blocks followed by two connected blocks was also successfully tested (with each convolutional block consisting of a convolutional layer, a dropout layer, and a batch normalization layer).

FIG. 8A depicts a simplified example of convolutional kernel as might be applied by a CNN. In this example, a column of interest 804 includes a selected data unit 802 under consideration. The convolutional convolution kernel 806 focuses on the selected data unit 802 and encompasses a region around the selected data unit 802 defined by the size and shape of the convolution kernel 806. The convolution kernel 806 may extend above and below the selected data unit 802 in the column of interest 804, and may also extend to columns adjacent to the column of interest (and to additional columns beyond that, depending on the size of the convolution kernel 806). The convolution kernel 806 may be provided as an input to the classifier 208, and then as a next input the selected data unit 802 may be moved to the next data unit in the column of interest 804. The convolution kernel 806 around that next data unit may be defined and the process may be repeated.

Note that FIG. 8A is a simplified example of a convolution kernel 806. In practice, the convolution kernel 806 may operate on the original data before it is flattened, or the flattened data. The convolution kernel 806 may apply to all of the data in the column of interest 804, or may be applied to sampled data.

In some cases, the data may be masked as part of the convolution. That is, some of the data within the convolution kernel 806 may be removed from consideration, which can improve throughput. For example, FIG. 8B depicts a convolution kernel 812 in which one masked row 814 has been removed from consideration.

This example also depicts a convolution kernel 812 as might be applied by a temporal network (a TNN or TCN). Note that a temporal network would generally be applied to data that is arranged in a temporal or size direction, which is not the case with the column of interest 810 in this example. The same example as in FIG. 1 and FIG. 8A has been used for ease of comparison, but in practice a temporal convolution kernel 812 would generally be applied to data that increases or decreases in terms of time, quantity, or some other value. Masking may be combined with sampling to further increase throughput.

In this example, the temporal convolution kernel 812 considers data in a forward temporal direction. For instance, if it is assumed that data increases down the column of interest 810, the convolution kernel 812 may be applied in the downward direction following a selected data unit 808. In contrast to the example from FIG. 8A, where the convolution kernel 806 is centered on the selected data unit 802 and encompasses data above the selected data unit 802 in the column of interest 804, in FIG. 8B the convolution kernel 812 begins with the selected data unit 808 and then includes data units extending in a forward direction down the column of interest 810.

Figure 9:
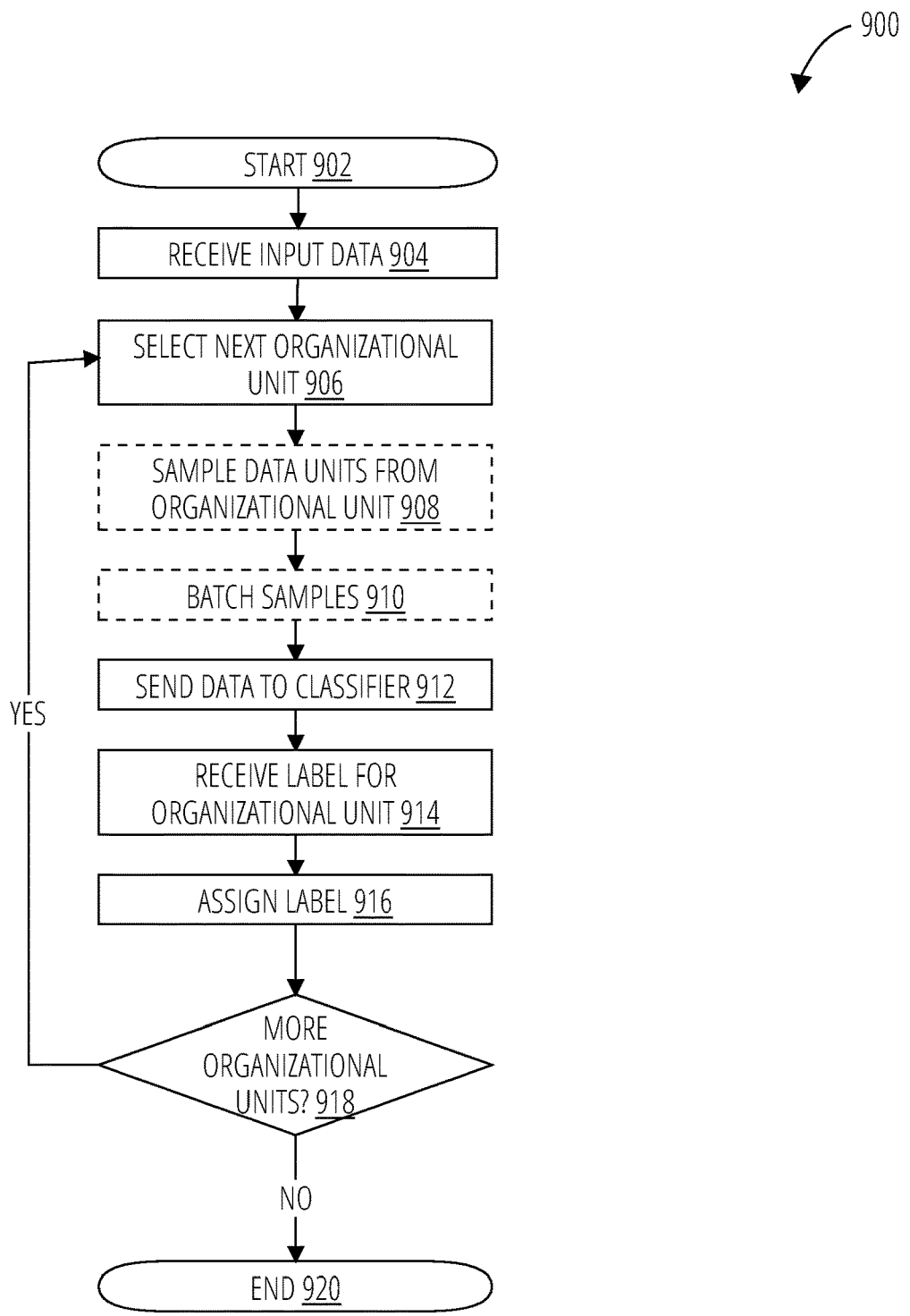
FIG. 9 is a flowchart depicting exemplary logic for labeling input data in accordance with one embodiment.

FIG. 9 is a flowchart depicting exemplary labeling logic 900 for applying a label to an organizational unit in a data structure according to an exemplary embodiment. The logic may be embodied as instructions stored on a computer-readable medium configured to be executed by a processor. The logic may be implemented by a suitable computing system configured to perform the actions described below.

Processing starts at start block 902. At block 904, the system may receive formatted input data arranged in an organizational structure. For instance, the input data may be in the form of a table arranged into rows and columns.

At block 906, the system may select the next organizational unit of interest. If the data is arranged into columns with the same type of data in each column (and different records being represented by rows), a column may be selected for analysis. If the data is instead arranged with the same type of data being represented across a row, then a row may be selected for analysis. If the data is arranged in some other say, a suitable sample of a region containing the same type of data may be selected. In some embodiments, the system may attempt to label all of the organizational units. In others, the system may only attempt to label a selected subset of the organizational units. If the system is not confident in the accuracy of an organizational unit at block 914, then the system may refrain from assigning a label to the organizational unit.

At block 908, the system may optionally sample data units from the organizational unit by selecting only a subset of the organizational unit. For example, the system may randomly sample cells within a column of interest. In some embodiments, the system may select the data units according to a pattern (e.g., every nth unit). In some embodiments, the system may consider all the data units in the selected organizational unit. The samples may be samples of a predetermined number of characters. Sampling the data in this manner may help to improve throughput.

At block 910, the system may optionally batch the samples identified at block 908. The system may combine the samples together into batches of a predetermined size. The size of the batches may be selected so as to maximize the amount of system RAM used.

Whether or not the data is sampled and batched, the data may be flattened, encoded, and embedded as described above. The data may then be sent to a classifier at block 912. The classifier may be trained and configured to operate on character-level data, and to analyze data arranged in the manner of the organizational unit selected at block 906 (e.g., columnar data).

At block 912, the classifier may receive the input data and provide it to an AI/ML model, such as an ANN, a DNN, a CNN, a TNN, or a TCN. Other types of classifiers may also be used. The classifier may be, for example, a CNN configured to apply a CRF layer as a final layer to improve accuracy. In some embodiments, the classifier may be a TNN to improve accuracy when operating on temporally-arranged data (or other sorted data arranged in an increasing or decreasing order). The TNN may apply masking to improve throughput.

At block 914, the system may receive one or more labels for the organizational unit based on classifying the data units with the classifier. The classifier may output, for example, one consensus label for the organizational unit, or one label for each of the data units. The labels may be selected from a predetermined set of labels—for example, the training data used to train the model may be labeled, and the labels used in the training data may define the set of labels available to the classifier. If multiple labels are output, the system may choose a label for the output based on the frequency by which each label occurs, a mode of the labels, a confidence of the classifier in each of the labels, random selection, or some other suitable technique. The labels considered may be subject to a minimum threshold requirement, so that labels that appear fewer than a predetermined threshold number of times are not considered as consensus labels for the organizational unit.

At block 916, the consensus label may be assigned or applied to the organizational unit. For example, the system may maintain a record for each organizational unit, in which the organizational unit is mapped to its label. The system may optionally generate a new data structure that includes the data from the original input received at block 904, but with the organizational units labeled using the labels received in block 914 (for example, the system may generate a new table in which the columns are labeled according to the labels determined by classifier, or a comma separated value list in which each data entry is represented by a key/value pair in which the key is the label and the value is the original data item). In some embodiments, the system may label each individual data item and store it in a database, and in some embodiments the system may combine multiple different inputs into a single data representation. In some embodiments, the system may retrieve the same type of data from multiple different input data structures and combine them into a single data structure made up entirely of data having the same label.

The thus-labeled data may then be used for any application in which labeled data is useful. For example, the labeled data may be used as training data for a further AI/ML system.

At decision block 918, the system may determine whether more organizational units remain for analysis. If the determination at decision block 918 is "yes" (i.e., more organizational units should be analyzed), then processing may return to block 906 and the next organizational unit for analysis may be selected. If the determination at decision block 918 is "no" (no more organizational units remain for analysis), then processing may proceed to done block 920 and terminate.

Figure 10:
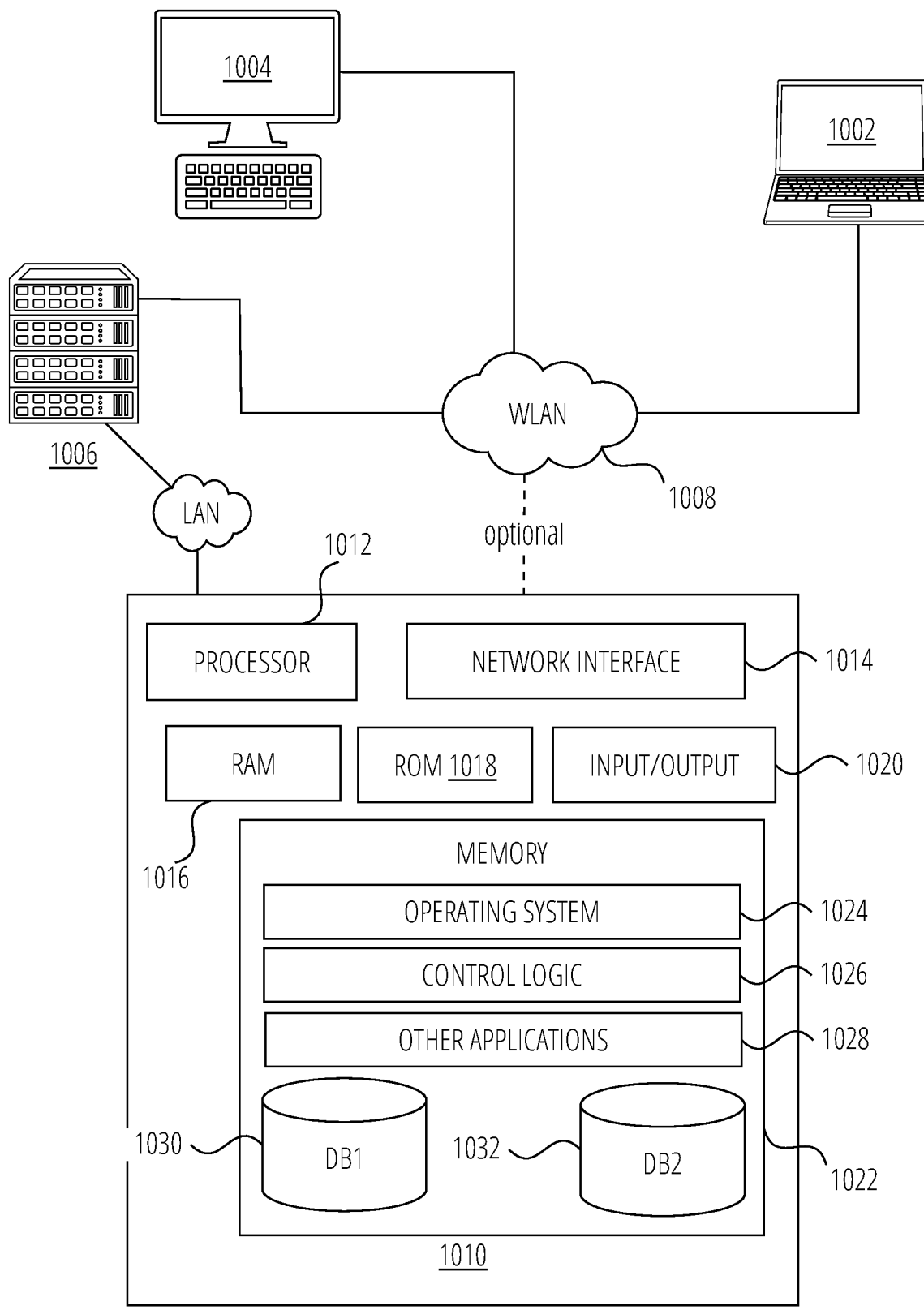
FIG. 10 depicts an illustrative computer system architecture that may be used to practice exemplary embodiments described herein.

FIG. 10 illustrates one example of a system architecture and data processing device that may be used to implement one or more illustrative aspects described herein in a stand-alone and/or networked environment. Various network nodes, such as the data server 1010, web server 1006, computer 1004, and laptop 1002 may be interconnected via a wide area network 1008 (WAN), such as the internet. Other networks may also or alternatively be used, including private intranets, corporate networks, LANs, metropolitan area networks (MANs) wireless networks, personal networks (PANs), and the like. Network 1008 is for illustration purposes and may be replaced with fewer or additional computer networks. A local area network (LAN) may have one or more of any known LAN topology and may use one or more of a variety of different protocols, such as ethernet. Devices data server 1010, web server 1006, computer 1004, laptop 1002 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1010, web server 1006, and client computer 1004, laptop 1002. Data server 1010 provides overall access, control and administration of databases and control software for performing one or more illustrative aspects described herein. Data server-data server 1010 may be connected to web server 1006 through which users interact with and obtain data as requested. Alternatively, data server 1010 may act as a web server itself and be directly connected to the internet. Data server 1010 may be connected to web server 1006 through the network 1008 (e.g., the internet), via direct or indirect connection, or via some other network. Users may interact with the data server 1010 using remote computer 1004, laptop 1002, e.g., using a web browser to connect to the data server 1010 via one or more externally exposed web sites hosted by web server 1006. Client computer 1004, laptop 1002 may be used in concert with data server 1010 to access data stored therein, or may be used for other purposes. For example, from client computer 1004, a user may access web server 1006 using an internet browser, as is known in the art, or by executing a software application that communicates with web server 1006 and/or data server 1010 over a computer network (such as the internet).

Servers and applications may be combined on the same physical machines, and retain separate virtual or logical addresses, or may reside on separate physical machines. FIG. 10 illustrates just one example of a network architecture that may be used, and those of skill in the art will appreciate that the specific network architecture and data processing devices used may vary, and are secondary to the functionality that they provide, as further described herein. For example, services provided by web server 1006 and data server 1010 may be combined on a single server.

Each component data server 1010, web server 1006, computer 1004, laptop 1002 may be any type of known computer, server, or data processing device. Data server 1010, e.g., may include a processor 1012 controlling overall operation of the data server 1010. Data server 1010 may further include RAM 1016, ROM 1018, network interface 1014, input/output interfaces 1020 (e.g., keyboard, mouse, display, printer, etc.), and memory 1022. Input/output interfaces 1020 may include a variety of interface units and drives for reading, writing, displaying, and/or printing data or files. Memory 1022 may further store operating system software 1024 for controlling overall operation of the data server 1010, control logic 1026 for instructing data server 1010 to perform aspects described herein, and other application software 1028 providing secondary, support, and/or other functionality which may or may not be used in conjunction with aspects described herein. The control logic may also be referred to herein as the data server software control logic 1026. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 1032 and a second database 1030. In some embodiments, the first database may include the second database (e.g., as a separate table, report, etc.). That is, the information can be stored in a single database, or separated into different logical, virtual, or physical databases, depending on system design. Web server 1006, computer 1004, laptop 1002 may have similar or different architecture as described with respect to data server 1010. Those of skill in the art will appreciate that the functionality of data server 1010 (or web server 1006, computer 1004, laptop 1002) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space), various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
    receiving formatted input data, the formatted input data comprising a plurality of data units organized into a plurality of organizational units;
    retrieving classifiable data from a first one of the organizational units;
    sending the classifiable data to a classifier, the classifier configured to perform a character-level classification and output a label from a predetermined set of labels;
    receiving a label for the classifiable data from the classifier; and
    assigning the label to the first one of the organizational units,
    wherein the classifier comprises a convolutional neural network (CNN) configured to operate on the organizational units, the CNN comprising a conditional random field (CRF).

2. The computer-implemented method of claim 1, wherein the data units are cells in a table and the organizational units are rows or columns in the table.

3. The computer-implemented method of claim 1, wherein the classifier is configured to extract information at a sub-data-unit level.

4. The computer-implemented method of claim 1, wherein:
    retrieving the classifiable data comprises breaking the first one of the organizational units into chunks of a predetermined size,
    sending the classifiable data to the classifier comprises sending the chunks to the classifier;
    receiving the label for the classifiable data comprises receiving a plurality of chunk labels, each chunk label corresponding to one of the chunks, and
    assigning the label comprises selecting one of the chunk labels as the label for the first one of the organizational units.

5. The computer-implemented method of claim 1, wherein:
    retrieving the classifiable data comprises breaking the first one of the organizational units into chunks of a predetermined size,
    sending the classifiable data to the classifier comprises grouping the chunks into one or more batches, and sending the one or more batches to the classifier;
    receiving the label for the classifiable data comprises receiving a plurality of batch labels, each batch label corresponding to one of the batches, and
    assigning the label comprises selecting one of the batch labels as the label for the first one of the organizational units.

6. The computer-implemented method of claim 1, wherein the data units are cells in a table and the organizational units are rows or columns in the table, and the CNN is configured to apply a convolution kernel that encompasses a particular data unit in the first organizational unit and an adjacent data unit in a second organizational unit.

7. The computer-implemented method of claim 1, wherein the data units are arranged in a temporal order and the classifier comprises a temporal neural network (TNN) configured to operate on the organizational units in a temporal direction, the TNN configured to mask a portion of the data units in the formatted input data.

8. The computer-implemented method of claim 1, wherein sending the classifiable data to the classifier comprises selecting a subset of the data units within the first organizational unit and sending only the subset of the data units to the classifier.

9. The computer-implemented method of claim 1, further comprising creating a character embedding from the classifiable data, wherein sending the classifiable data to the classifier comprises sending the character embedding to the classifier.

10. The computer-implemented method of claim 1, further comprising flattening the input data by concatenating multiple data units of the input data.

11. A non-transitory computer-readable storage medium, the computer-readable storage medium including instructions that when executed by a computer, cause the computer to:
receive formatted input data, the formatted input data comprising a plurality of data units organized into a plurality of organizational units;
retrieve classifiable data from a first one of the organizational units;
send the classifiable data to a classifier, the classifier configured to perform a character-level classification and output a label from a predetermined set of labels;
receive a label for the classifiable data from the classifier; and
assign the label to the first one of the organizational units,
wherein the classifier is a convolutional neural network (CNN) configured to operate on the organizational units, the CNN comprising a conditional random field (CRF).

12. The computer-readable storage medium of claim 11, wherein the data units are cells in a table and the organizational units are rows or columns in the table.

13. The computer-readable storage medium of claim 11, wherein the classifier is configured to extract information at a sub-data-unit level.

14. The computer-readable storage medium of claim 11, wherein:
retrieving the classifiable data comprises breaking the first one of the organizational units into chunks of a predetermined size,
sending the classifiable data to the classifier comprises sending the chunks to the classifier;
receiving the label for the classifiable data comprises receiving a plurality of chunk labels, each chunk label corresponding to one of the chunks, and
assigning the label comprises selecting one of the chunk labels as the label for the first one of the organizational units.

15. The computer-readable storage medium of claim 11, wherein:
retrieving the classifiable data comprises breaking the first one of the organizational units into chunks of a predetermined size,
sending the classifiable data to the classifier comprises grouping the chunks into one or more batches, and sending the one or more batches to the classifier;
receiving the label for the classifiable data comprises receiving a plurality of batch labels, each batch label corresponding to one of the batches, and
assigning the label comprises selecting one of the batch labels as the label for the first one of the organizational units.

16. The computer-readable storage medium of claim 11, wherein the data units are cells in a table and the organizational units are rows or columns in the table, and the CNN is configured to apply a convolution kernel that encompasses a particular data unit in the first organizational unit and an adjacent data unit in a second organizational unit.

17. The computer-readable storage medium of claim 11, wherein the data units are arranged in a temporal order and the classifier comprises a temporal neural network (TNN) configured to operate on the organizational units in a temporal direction, the TNN configured to mask a portion of the data units in the formatted input data.

18. The computer-readable storage medium of claim 11, wherein sending the classifiable data to the classifier comprises select a subset of the data units within the first organizational unit and sending only the subset of the data units to the classifier.

19. The computer-readable storage medium of claim 11, wherein the instructions further configure the computer to create a character embedding from the classifiable data, wherein sending the classifiable data to the classifier comprises sending the character embedding to the classifier.

20. The computer-readable storage medium of claim 11, the instructions, when executed by the computer, cause the computer to flatten the input data by concatenating multiple data units of the input data.

* * * * *